US008095073B2

(12) United States Patent
Hayes et al.

(10) Patent No.: US 8,095,073 B2
(45) Date of Patent: Jan. 10, 2012

(54) METHOD AND APPARATUS FOR IMPROVED MOBILE STATION AND HEARING AID COMPATIBILITY

(75) Inventors: Gerard J. Hayes, Wake Forest, NC (US); Rodney O. Williams, Cary, NC (US); Michael D. Townsend, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1218 days.

(21) Appl. No.: 10/873,675

(22) Filed: Jun. 22, 2004

(65) Prior Publication Data

US 2006/0009156 A1   Jan. 12, 2006

(51) Int. Cl.
*H04B 1/00* (2006.01)
*H04R 25/00* (2006.01)

(52) U.S. Cl. .......................... 455/63.1; 381/312; 381/331
(58) Field of Classification Search .................. 455/63.1, 455/570, 575.1–575.4, 575.8, 95, 114.2
See application file for complete search history.

(56) References Cited

U.S. PATENT DOCUMENTS

| | | | | |
|---|---|---|---|---|
| 4,471,171 A | * | 9/1984 | Kopke et al. | 381/60 |
| 5,086,464 A | * | 2/1992 | Groppe | 381/331 |
| 5,202,927 A | * | 4/1993 | Topholm | 381/315 |
| 5,388,185 A | * | 2/1995 | Terry et al. | 704/205 |
| 5,402,493 A | * | 3/1995 | Goldstein | 381/61 |
| 5,430,802 A | * | 7/1995 | Page | 381/96 |
| 5,450,619 A | * | 9/1995 | Maeda | 455/566 |
| 5,603,100 A | * | 2/1997 | Yasuda | 455/566 |
| 5,721,783 A | * | 2/1998 | Anderson | 381/328 |
| 5,727,070 A | * | 3/1998 | Coninx | 381/321 |
| 5,751,820 A | * | 5/1998 | Taenzer | 381/312 |
| 5,768,397 A | * | 6/1998 | Fazio | 381/312 |
| 5,910,997 A | * | 6/1999 | Ishige et al. | 381/314 |
| 6,009,311 A | * | 12/1999 | Killion et al. | 455/63.1 |
| 6,064,894 A | * | 5/2000 | Zurek et al. | 455/569.1 |
| 6,104,808 A | * | 8/2000 | Alameh et al. | 379/433.02 |

(Continued)

FOREIGN PATENT DOCUMENTS

EP   0 661 823   7/1995

(Continued)

OTHER PUBLICATIONS

PCT International Search Report dated Apr. 22, 2005; PCT Application No. PCT/US2004/043200 filed Dec. 21, 2004.

*Primary Examiner* — Yuwen Pan
*Assistant Examiner* — Ayodeji Ayotunde
(74) *Attorney, Agent, or Firm* — Coats & Bennett, P.L.L.C.

(57) ABSTRACT

A mobile station includes an adjustable member for increasing a separation distance between an audio signal output device and an electronic circuit to reduce EMI proximate the audio signal output device caused by the electronic circuit. In one embodiment, the adjustable member comprises a slide member that extends at least a portion of the audio signal output device away from the electronic circuit to increase the separation distance. In another embodiment, the adjustable member comprises a pivot member that rotates the electronic circuit (or audio signal output device) away from the audio signal output device (or electronic circuit) to increase the separation distance. In any event, increasing the separation distance between the audio signal output device and the electronic circuit decreases the EMI proximate the audio signal output device, and therefore EMI effects on external circuits proximate the mobile station, such as a hearing aid.

24 Claims, 8 Drawing Sheets

U.S. PATENT DOCUMENTS

| | | | |
|---|---|---|---|
| 6,140,960 A * | 10/2000 | Kitayoshi | 342/360 |
| 6,292,563 B1 * | 9/2001 | Clark et al. | 379/433.13 |
| 6,311,155 B1 * | 10/2001 | Vaudrey et al. | 704/225 |
| 6,373,006 B1 * | 4/2002 | Toki | 200/61.7 |
| 6,381,308 B1 * | 4/2002 | Cargo et al. | 379/52 |
| 6,453,045 B1 * | 9/2002 | Zurek et al. | 379/433.02 |
| 6,564,038 B1 * | 5/2003 | Bethea et al. | 455/63.1 |
| 6,639,564 B2 * | 10/2003 | Johnson | 343/702 |
| 6,639,987 B2 * | 10/2003 | McIntosh | 381/71.6 |
| 6,684,063 B2 * | 1/2004 | Berger et al. | 455/90.1 |
| 6,721,561 B1 * | 4/2004 | Jeong et al. | 455/433 |
| 6,748,249 B1 * | 6/2004 | Eromaki et al. | 455/575.4 |
| 6,758,303 B2 * | 7/2004 | Zurek et al. | 181/155 |
| 6,823,171 B1 * | 11/2004 | Kaario | 455/41.1 |
| 6,879,337 B2 * | 4/2005 | Tatehana et al. | 348/14.02 |
| 6,888,948 B2 * | 5/2005 | Hagen et al. | 381/314 |
| 6,895,345 B2 * | 5/2005 | Bye et al. | 702/57 |
| 7,120,477 B2 * | 10/2006 | Huang | 455/575.7 |
| 7,187,956 B2 * | 3/2007 | Sugino et al. | 455/575.3 |
| 7,242,765 B2 * | 7/2007 | Hairston | 379/419 |
| 7,257,372 B2 * | 8/2007 | Kaltenbach et al. | 455/41.2 |
| 7,317,932 B2 * | 1/2008 | Lai et al. | 455/556.1 |
| 7,373,186 B2 * | 5/2008 | Watanabe et al. | 455/575.3 |
| 7,426,279 B2 * | 9/2008 | Cochran et al. | 381/331 |
| 7,474,298 B2 * | 1/2009 | Nguyen et al. | 345/169 |
| 2001/0036845 A1 * | 11/2001 | Park | 455/566 |
| 2001/0041602 A1 * | 11/2001 | Berger et al. | 455/570 |
| 2002/0061732 A1 * | 5/2002 | Seto et al. | 455/67.1 |
| 2002/0123308 A1 * | 9/2002 | Feltstrom | 455/63 |
| 2002/0155811 A1 * | 10/2002 | Prismantas et al. | 455/63 |
| 2003/0040345 A1 * | 2/2003 | Berger et al. | 455/575 |
| 2003/0064746 A1 * | 4/2003 | Rader et al. | 455/550 |
| 2003/0130017 A1 * | 7/2003 | Shiotsu et al. | 455/575 |
| 2003/0132884 A1 * | 7/2003 | Ragner et al. | 343/702 |
| 2004/0053575 A1 * | 3/2004 | Eckert et al. | 455/63.1 |
| 2004/0166907 A1 | 8/2004 | Yajima | |
| 2005/0020214 A1 * | 1/2005 | Neill et al. | 455/73 |
| 2005/0074079 A1 * | 4/2005 | Jin | 375/346 |
| 2005/0185813 A1 * | 8/2005 | Sinclair et al. | 381/380 |
| 2005/0191964 A1 * | 9/2005 | Hundal | 455/63.1 |
| 2005/0207586 A1 * | 9/2005 | Lin et al. | 381/74 |
| 2006/0009156 A1 * | 1/2006 | Hayes et al. | 455/63.1 |
| 2006/0030377 A1 * | 2/2006 | White et al. | 455/575.1 |
| 2006/0277049 A1 * | 12/2006 | Huang | 704/275 |
| 2007/0032271 A1 * | 2/2007 | Chan et al. | 455/569.1 |
| 2007/0120650 A1 * | 5/2007 | Nagai et al. | 340/10.2 |
| 2007/0123309 A1 * | 5/2007 | Sano et al. | 455/566 |
| 2007/0225050 A1 * | 9/2007 | Kaltenbach et al. | 455/570 |
| 2008/0207282 A1 * | 8/2008 | Schaffler | 455/575.3 |

FOREIGN PATENT DOCUMENTS

| | | |
|---|---|---|
| EP | 661823 A1 * | 7/1995 |
| EP | 0661823 B1 | 4/2002 |
| EP | 1 271 899 | 1/2003 |
| JP | 7202748 A | 8/1995 |
| JP | 9167977 A | 6/1997 |
| JP | 10174194 A | 6/1998 |
| JP | 2003169120 A | 6/2003 |
| JP | 2004015628 A | 1/2004 |
| JP | 2004072285 A | 3/2004 |
| JP | 2004166054 A | 6/2004 |
| WO | WO 00/11851 | 3/2000 |

* cited by examiner

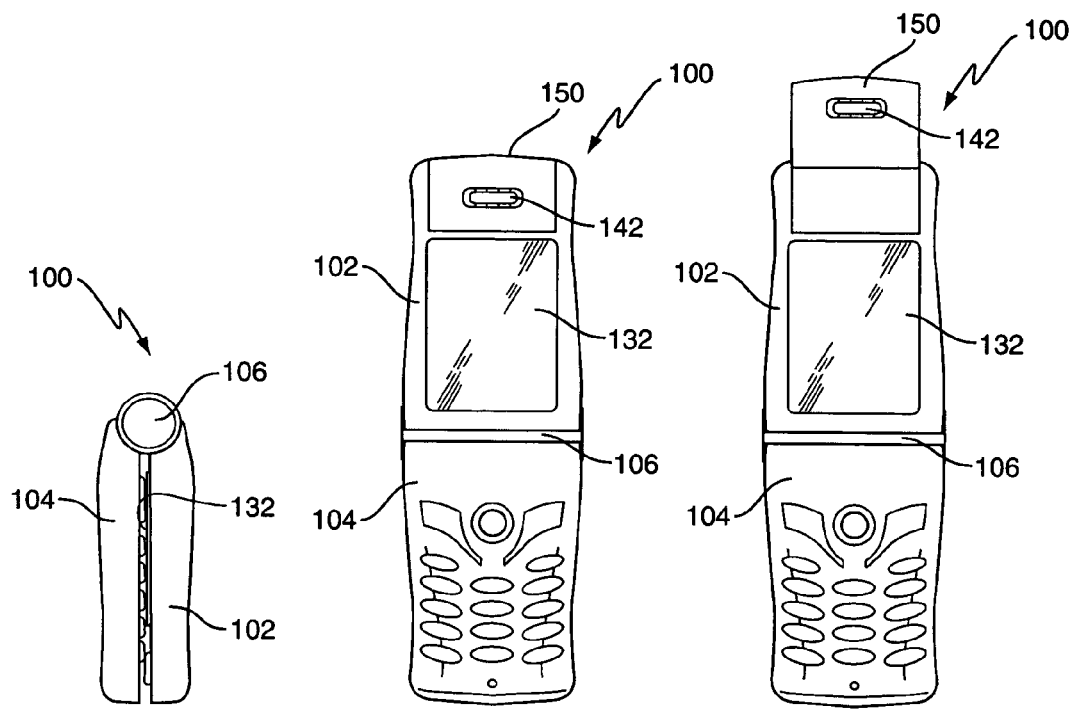
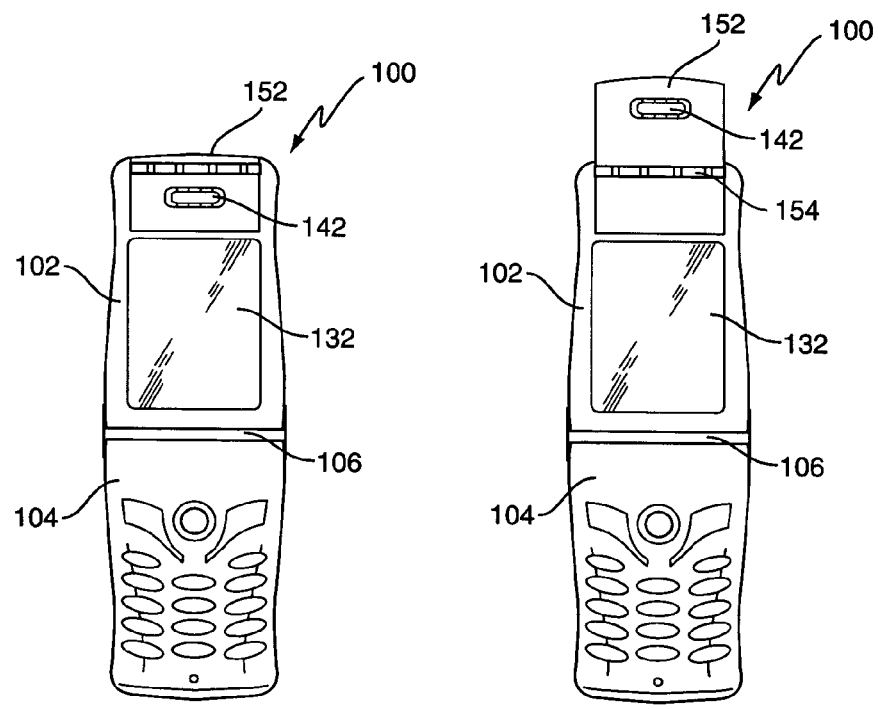
FIG. 6A  FIG. 6B  FIG. 6C
FIG. 7A  FIG. 7B

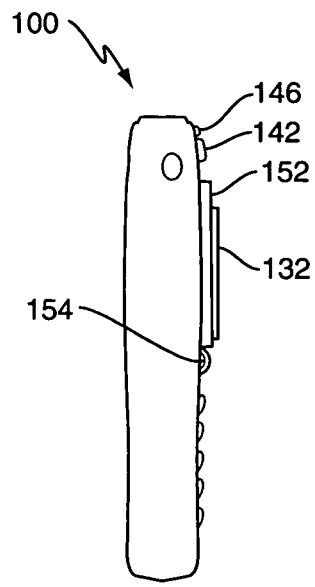
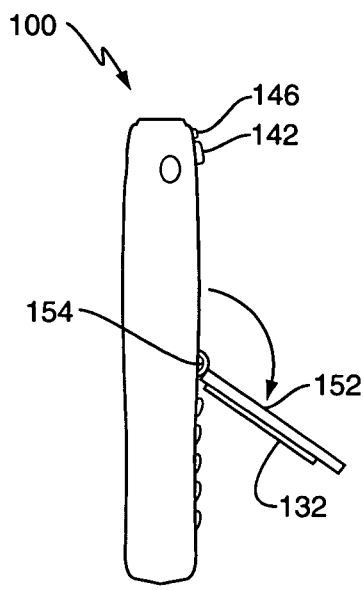
*FIG. 8A*  *FIG. 8B*
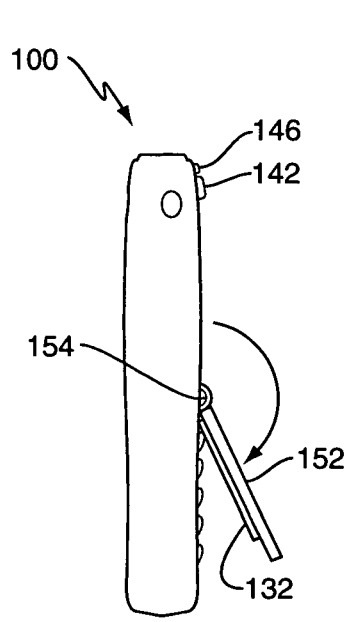
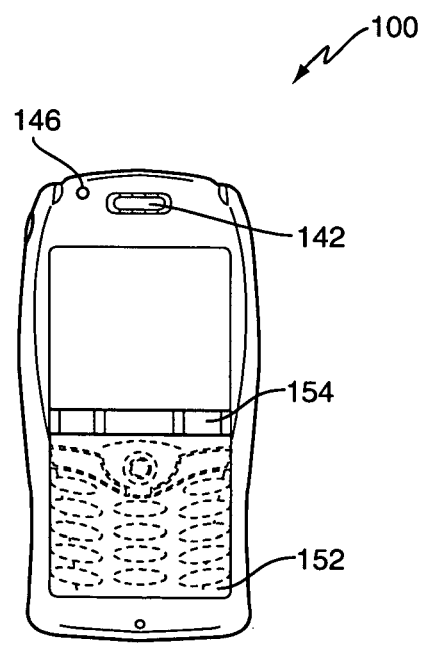
*FIG. 8C*  *FIG. 8D*

METHOD AND APPARATUS FOR IMPROVED MOBILE STATION AND HEARING AID COMPATIBILITY

BACKGROUND OF THE INVENTION

The present invention relates generally to reducing electromagnetic interference between a mobile station and a hearing aid.

Hearing aids typically include electronic circuits for amplifying audible sounds, such as those provided by a speaker, a voice, an instrument, etc., so that a hearing impaired individual can better hear. A hearing aid may also include processing circuits for processing the audible sounds to improve the quality of the sound heard by the individual by, for example, filtering noise from the audible sounds received by the hearing aid. However, in noisy environments, such as a shopping mall, a city street, concert halls, etc., the hearing aid may have difficulty removing the noise without also removing the desired audible sounds.

To address this problem, some hearing aids may include electro-magnetic processing circuits in addition to the audio amplification and processing circuits. The electro-magnetic processing circuits sense and process electro-magnetic signals received by an electro-magnetic receiver in the hearing aid, such as a T-coil, to create sound waves that enable the hearing impaired individual to hear sound corresponding to the received electro-magnetic signals. This feature is particularly useful in any environment where desired audio signals are used to generate electro-magnetic signals. For example, an individual may switch the audio amplification circuits off and switch the electro-magnetic processing circuits on while talking on a cellular telephone. In so doing, the individual hears audible sound generated by the hearing aid in response to electro-magnetic signals produced by the cellular telephone speaker while effectively blocking out the "audible" environmental sounds.

Unfortunately, electro-magnetic processing circuits also detect other electro-magnetic signals, such as the electro-magnetic signals produced by various electronic circuits associated with the cellular telephone. As a result, sound generated by the electro-magnetic processing circuits in the hearing aid may be distorted. Further, while the electro-magnetic signals generated by the cellular telephone circuits do not generally interfere with the operation of the cellular telephone, they may interfere with the operation of a nearby electronic circuit external to the cellular telephone, i.e., the audio amplification circuits and/or the electro-magnetic processing circuits of a hearing aid. Therefore, electro-magnetic interference (EMI) generated by a cellular telephone typically degrades the performance of a hearing aid.

SUMMARY OF THE INVENTION

The present invention comprises a method and apparatus that reduces electro-magnetic interference (EMI) proximate an audio signal output device by selectively increasing a distance between the audio signal output device and an electronic circuit that generates the EMI. According to the present invention, a mobile station includes an adjustable member that selectively moves between a first use position and a second use position. The first use position defines a first separation distance between the audio signal output device and the electronic circuit. The second use position defines a second separation distance, greater than the first separation distance, between the audio signal output device and the electronic circuit. By moving the adjustable member to the second use position, the user increases the distance between the audio signal output device and the electronic circuit, and therefore, decreases the EMI proximate the audio signal output device that is caused by the electronic circuit.

In one embodiment, the adjustable member comprises a slide member that includes at least part of the audio signal output device. Extending the slide member from the first use position to the second use position increases the distance between the audio signal output device and the electronic circuit, and therefore, reduces EMI proximate the audio signal output device.

In another embodiment, the adjustable member comprises a pivot member that includes at least part of the audio signal output device. Alternatively, the pivot member may include the electronic circuit. In either case, rotating the pivot member from the first use position to the second use position increases the distance between the audio signal output device and the electronic circuit, and therefore, reduces EMI proximate the audio signal output device.

BRIEF DESCRIPTION OF THE DRAWINGS

FIGS. 6A-6C illustrate an exemplary flip-type mobile station with a slide member according to the present invention.

FIGS. 7A-7B illustrate an exemplary flip-type mobile station with a pivot member according to the present invention.

FIGS. 8A-8D illustrate an exemplary stick-type mobile station with a pivot member according to the present invention.

DETAILED DESCRIPTION OF THE INVENTION

Figure 1:
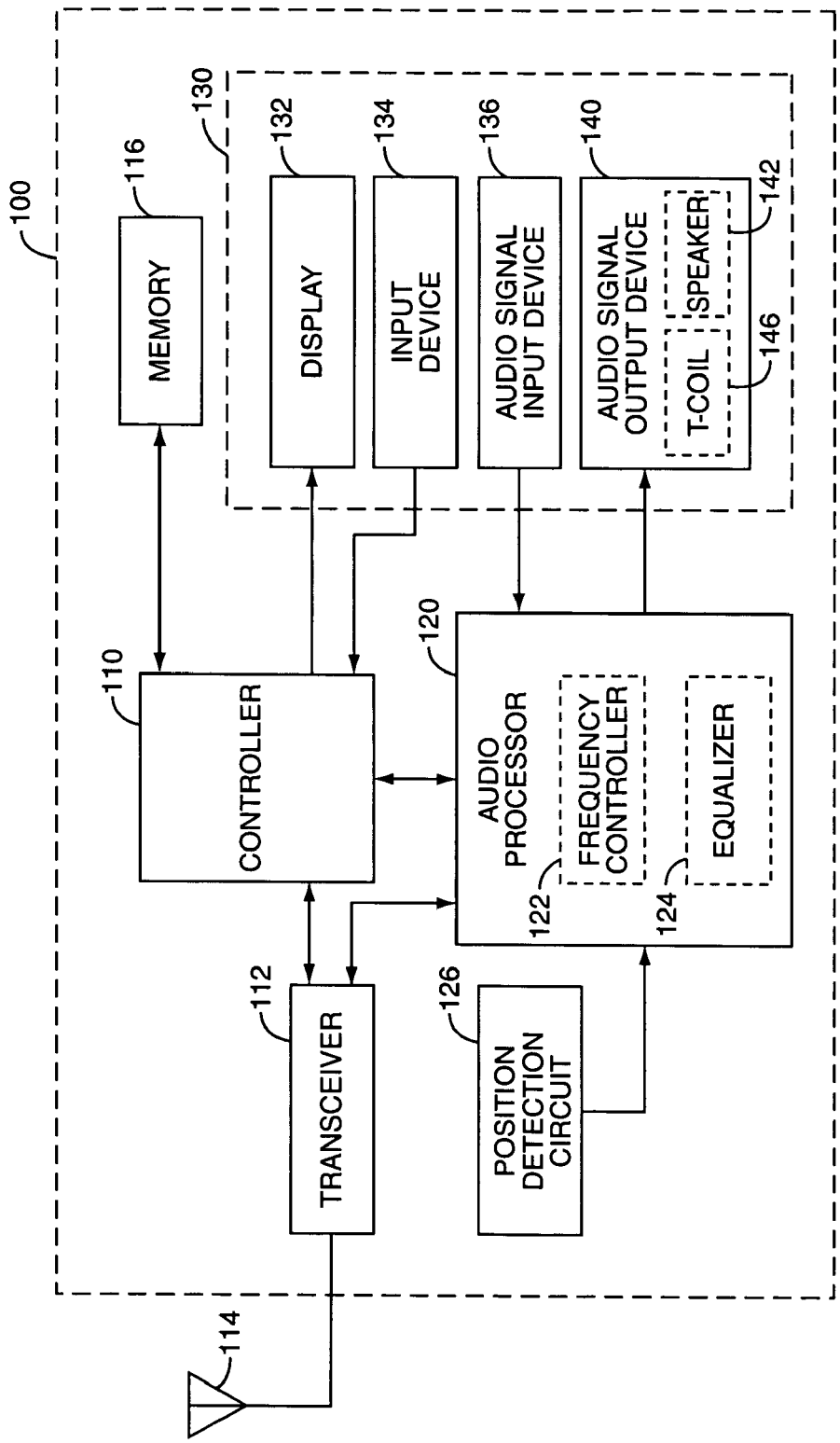
FIG. 1 illustrates a block diagram of an exemplary mobile station according to the present invention.

FIG. 1 illustrates a block diagram of an exemplary mobile station 100 according to the present invention. As used herein the term "mobile station" may include cellular telephones, satellite telephones, personal communication services (PCS) devices, personal data assistants (PDAs), palm-top computers, laptop computers, pagers, and the like.

Mobile station 100 includes controller 110, transceiver 112, antenna 114, memory 116, audio processing circuit 120, and user interface 130. Controller 110 controls the operation of mobile station 100 according to the programs stored in memory 116. Controller 110 may comprise a single microprocessor or multiple microprocessors. Suitable microprocessors may include, for example, both general purpose and special purpose microprocessors and digital signal processors. Transceiver 112 is a fully functional cellular radio transceiver for transmitting signals and receiving signals via antenna 114. Those skilled in the art will appreciate that transceiver 112 may operate according to any known communication standard. Memory 116 represents the entire hierarchy of memory in a mobile station 100, and may include both random access memory (RAM) and read-only memory (ROM). Data and computer program instructions-required for operation are stored in non-volatile memory, such as EPROM, EEPROM, and/or flash memory, which may be implemented as discrete devices, stacked devices, or integrated with controller 110.

User interface 130 enables a user to exchange information with the mobile station 100, and includes a display 132, an input device 134, an audio signal input device 136, and an audio signal output device 140. Display 132, such as a liquid crystal display, allows operators to see dialed digits, images, call status, menu options, and other service information. Input device 134 enables the user to enter data, to enter commands, and to select options, and may comprise a keypad, touchpad, joystick, pointing device, switches, pushbuttons, or any other form of computer input device. Mobile station 100 may use two or more input devices to perform the same or different functions.

Audio signal input device 136, such as a microphone, converts speech into electrical audio signals for processing by audio processor 120. Audio signal output device 140, such as a speaker 142 and/or a T-coil 146, converts audio signals provided by audio processor 120 into acoustic signals, such as audible sounds, and/or electro-magnetic signals that are projected from mobile station 100. As shown in FIG. 1, audio processor 120 may include a frequency controller 122 for controlling the level of a specific frequency of the audio signal that drives the audio signal output device 140. Audio processor 120 may also include an equalizer 124 for controlling the signal equalization settings of the acoustic and/or electro-magnetic signals output by mobile station 100.

As understood by those skilled in the art, various electronic circuits associated with mobile station 100, such as controller 110, transceiver 112, display 132, etc., emit electro-magnetic interference (EMI) when the phone is operational. When the EMI generating electronic circuits are located near the audio signal output device 140, the EMI proximate the audio signal output device 140 may be large enough to interfere with the operation of a nearby external circuit, such as a hearing aid. The mechanical design of conventional mobile stations provides some separation between the audio signal output device 140 and the EMI generating electronic circuits by placing components of the mobile station to maximize a separation distance. However, the decreasing size of mobile stations limits the actual separation distance, and therefore the control of the EMI proximate the audio signal output device 140, achievable by component placement alone.

The present invention reduces the EMI proximate the audio signal output device 140, and therefore reduces EMI effects on a hearing aid (not shown), by selectively increasing the distance between the audio signal output device 140, such as a speaker 142, and the electronic circuit associated with the mobile station 100, such as circuits associated with a controller 110, a transceiver 112, a display 132, etc., that causes the EMI. In an exemplary embodiment, the mobile station 100 of the present invention includes an adjustable member that varies the separation distance between the audio signal output device 140 and the electronic circuit to vary the EMI proximate the audio signal output device 140. In particular, the adjustable member enables a user to increase the separation distance between the audio signal output device 140 and the electronic circuit to reduce the EMI proximate audio signal output device 140.

FIGS. 2-11 illustrate various embodiments of a mobile station 100 that implements an adjustable member according to the present invention. In FIGS. 2-5, mobile station 100 comprises a stick-type mobile station and the adjustable member comprises a slide member 150 that includes at least a portion of the audio signal output device 140. Extending the slide member 150 outwardly from the body of mobile station 100 increases the distance between the audio signal output device 140 and one or more electronic circuits associated with mobile station 100, such as the circuits associated with display 132. As a result, EMI proximate the audio signal output device 140 is reduced.

Figure 2A:
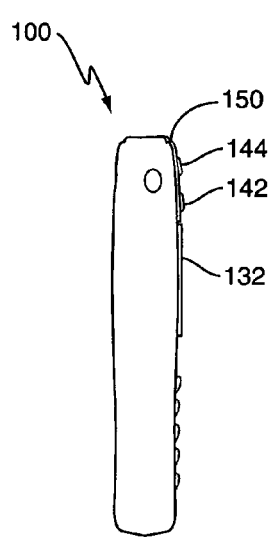
FIGS. 2A-2C illustrate an exemplary stick-type mobile station with a slide member according to the present invention.
Figure 2B:
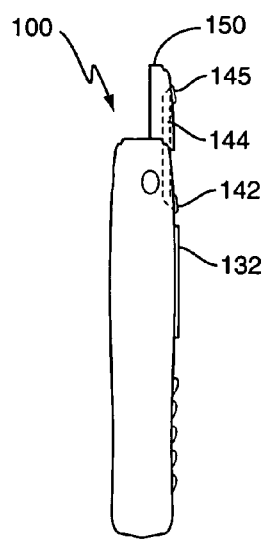
Figure 2C:
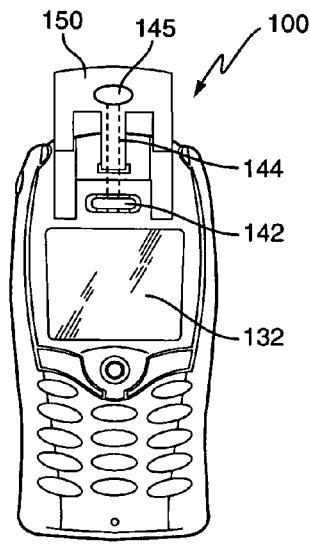

In one exemplary embodiment, shown in FIGS. 2A-2C, slide member 150 includes an acoustic channel 144 that operates as a conduit for audible sound projected by speaker 142. When slide member 150 is positioned in a first use position, shown in FIG. 2A, speaker 142 and an output port 145 of acoustic channel 144 are in close proximity to each other. However, positioning slide member 150 in a second use position, shown in FIGS. 2B-2C, increases the separation distance between the speaker 142 and the output port 145 of acoustic channel 144, which in turn increases the separation distance between the output port 145 of acoustic channel 144 and the electronic circuits associated with mobile station 100. By increasing the separation distance between the output port 145 of acoustic channel 144 and the electronic circuits of mobile station 100, slide member 150 has decreased the EMI at the output port 145 of acoustic channel 144. As a result, a hearing aid positioned proximate the output port 145 of the acoustic channel 144 when slide member 150 is positioned in the second use position experiences less EMI than when slide member 150 is positioned in the first use position.

Figure 3A:
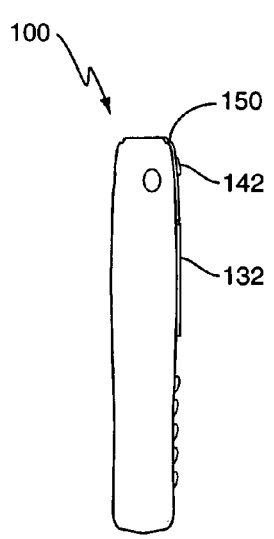
FIGS. 3A-3C illustrate another exemplary stick-type mobile station with a slide member according to the present invention.
Figure 3B:
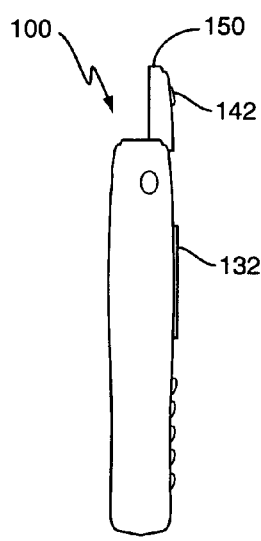
Figure 3C:
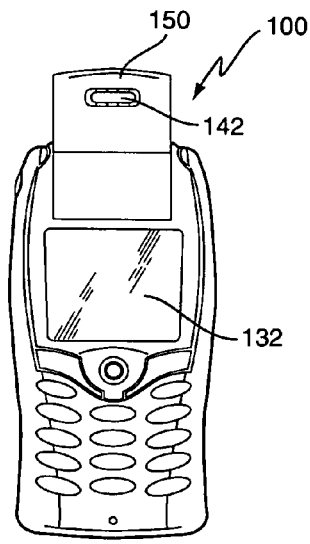

FIGS. 3A-3C illustrate an alternative embodiment where slide member 150 includes speaker 142. In this embodiment, moving slide member 150 from the first use position, shown in FIG. 3A, to the second use position, shown in FIGS. 3B-3C, increases the distance between speaker 142 and the electronic circuits associated with mobile station 100. As with the embodiment of FIGS. 2A-2C, increasing the separation distance between the speaker 142 and the electronic circuits decreases the electro-magnetic effects of the electronic circuits on a hearing aid disposed proximate the speaker 142.

In addition to projecting audible sound in response to an audio signal applied to the speaker 142, speaker 142 may also project an audio electro-magnetic signal in response to the applied audio signal. As a result, a hearing aid with an electro-magnetic receiver, such as a T-coil, may detect and process the audio electro-magnetic signal, independently of the acoustic signal projected by speaker 142, to provide audible sound to the user. As discussed above, this feature is particularly useful when hearing aids are used with mobile stations in a loud environment. By enabling the T-coil in the hearing aid, the hearing aid can block out the loud environment and focus on only the audible sound generated by the T-coil in the hearing aid in response to the projected audio electro-magnetic signal.

Figure 4A:
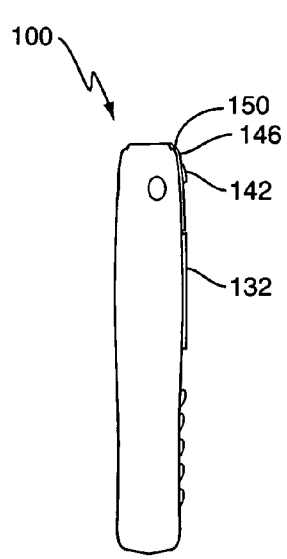
FIGS. 4A-4C illustrate another exemplary stick-type mobile station with a slide member according to the present invention.
Figure 4B:
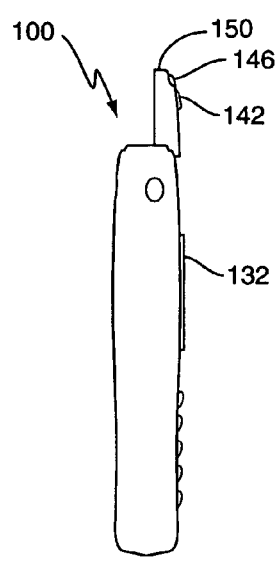
Figure 4C:
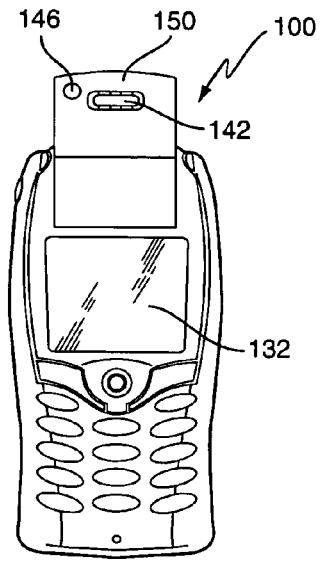
Figure 5A:
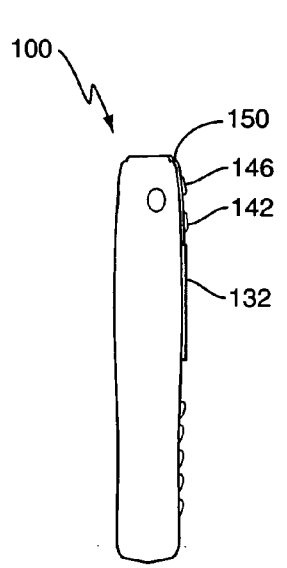
FIGS. 5A-5C illustrate another exemplary stick-type mobile station with a slide member according to the present invention.
Figure 5B:
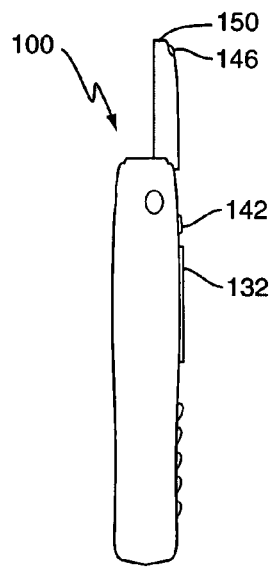
Figure 5C:
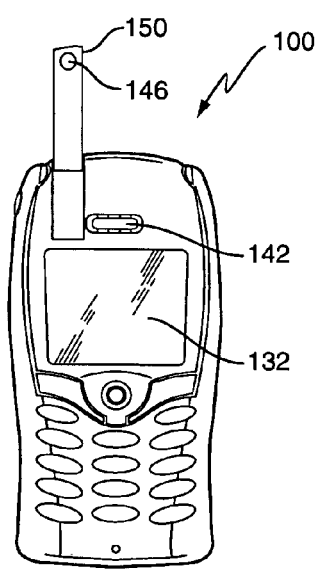

However, the audio electro-magnetic signal generated by speaker 142 is not always strong enough to be adequately received or processed by the T-coil in a hearing aid. To address this problem, mobile station 100 may include a booster T-coil 146 to replace or supplement the audio electro-magnetic signal provided by speaker 142. When booster T-coil 146 is included as part of audio signal output device 140, slide member 150 may also include booster T-coil 146 with speaker 142, as shown in FIGS. 4A-4C. Alternatively, slide member 150 may only include booster T-coil, as shown in FIGS. 5A-5C. Further, while not shown, the slide member 150 of FIGS. 2A-2C may also include booster T-coil 146. In any event, extending slide member 150 from the first use position (FIGS. 4A and 5A) to the second use position (FIGS. 4B-4C and 5B-5C) increases the distance between the booster T-coil 146 and the electronic circuits associated with mobile station 100, which reduces the EMI proximate the booster T-coil 146 and/or speaker 142. As a result, a hearing aid positioned proximate the booster T-coil 146 when slide member 150 is positioned in the second use position experiences less EMI than when slide member 150 is positioned in the first use position.

FIGS. 6A-6C illustrate a flip-type mobile station 100 that also uses slide member 150 to increase the separation distance between the audio signal output device 140 and the EMI generating electronic circuits, i.e., display 132. Flip-type mobile station 100 comprises a flip member 102, a base member 104, and a rotational coupler 106 that couples flip member 102 to base member 104. The flip member 102 moves between a closed position (FIG. 6A) and an open position (FIGS. 6B-6C). The open position, shown in FIGS. 6B-6C, is referred to herein as a "use position." Further, it will be appreciated by those skilled in the art that the closed position may also represent a "use position" when the mobile station 100 is closed but operating in a non-idle voice communication mode. As used herein, the term "use position" is defined as a non-idle operating position where mobile station 100 operates in a voice communications mode.

When flip-type mobile station 100 is opened, as shown in FIGS. 6B-6C, a user has access to slide member 150, which may include speaker 142. While not shown, those skilled in the art will appreciate that slide member 150 of flip-type mobile station 100 may alternatively include acoustic channel 144, booster T-coil 146, or any combination thereof. As with the previously described embodiments, moving slide member 150 from the first use position, shown in FIG. 6B, to the second use position, shown in FIG. 6C, decreases the EMI proximate audio signal output device 140, i.e., speaker 142, which improves the performance of a hearing aid positioned proximate audio signal output device 140.

The above-described embodiments use a slide member 150 to increase the separation distance between audio signal output device 140 and the electronic circuits associated with mobile station 100. However, other adjustable members may be used to increase the separation distance. FIGS. 7-10 illustrate various embodiments using a pivot member 152 to increase the separation distance. Pivot member 152 includes at least part of the audio signal output device 140 or one or more of the EMI generating electronic circuits associated with mobile station 100. By rotating pivot member 152 from a first use position to a second use position, the distance between the audio signal output device 140 and the electronic circuits within the mobile station 100 increases. As a result, EMI proximate the audio signal output device 140 is reduced.

As an example, consider the flip-type mobile station 100 of FIGS. 7A-7B, which includes a pivot member 152 connected to the mobile station 100 by hinge 154 or other rotational coupler. As shown in FIGS. 7A-7B, pivot member 152 includes audio signal output device 140, such as speaker 142. However, it will be appreciated that pivot member 152 may alternatively include acoustic channel 144, booster T-coil 146, or any combination thereof. In any event, rotating pivot member 152 about hinge 154 from a first use position, shown in FIG. 7A, to a second use position, shown in FIG. 7B, increases the separation distance between the audio signal output device 140 and electronic circuits associated with mobile station 100, such as display 132 with display circuitry, controller 110, transceiver 112, etc. As a result, EMI proximate the audio signal output device 140 is reduced.

Alternatively, pivot member 152 may include an electronic circuit, i.e., display 132 and any corresponding circuitry, as shown by the stick-type mobile station 100 of FIGS. 8A-8D. It will be appreciated by those skilled in the art that pivot member 152 may also include other electronic circuits, such as controller 110, transceiver 112, etc. Rotating pivot member 152 about hinge 154 from the first use position, shown in FIG. 8A to the second use position, shown in FIGS. 8C and 8D, increases the separation distance between the display circuit 132 and the audio signal output device 140.

FIGS. 9A-9D illustrate another exemplary flip-type mobile station 100 that uses a pivot member 152 to reduce EMI proximate the audio signal output device 140. As with the stick-type mobile station 100 of FIG. 8, flip-type mobile station 100 uses pivot member 152 to rotate electronic circuits from the first use position, shown in FIG. 9A, to the second use position away from the audio signal output device 140, shown in FIGS. 9C and 9D to reduce EMI proximate the audio signal output device 140. It will be appreciated by those skilled in the art that pivot member 152 may rotate about hinge 154, as described above, or about rotational coupler 106, where rotational coupler 106 comprises a double hinge or other specialty rotational coupler to enable pivot member 152 to rotate independently from flip member 102 and base member 104.

Figure 9A:
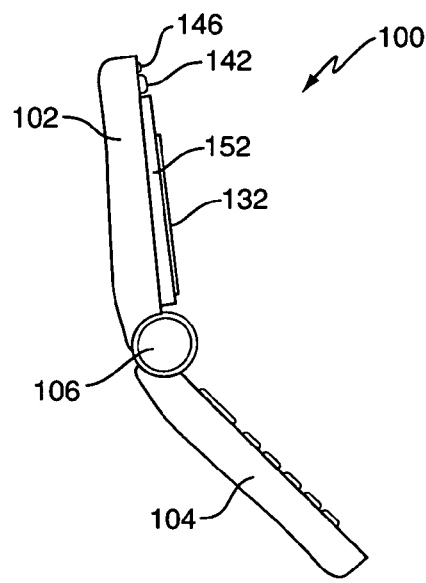
FIGS. 9A-9D illustrate another exemplary flip-type mobile station with a pivot member according to the present invention.
Figure 9B:
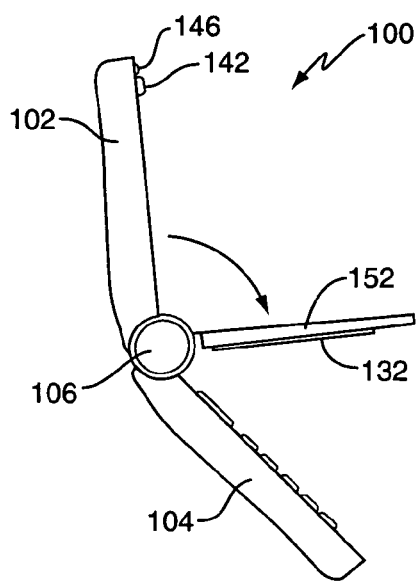
Figure 9C:
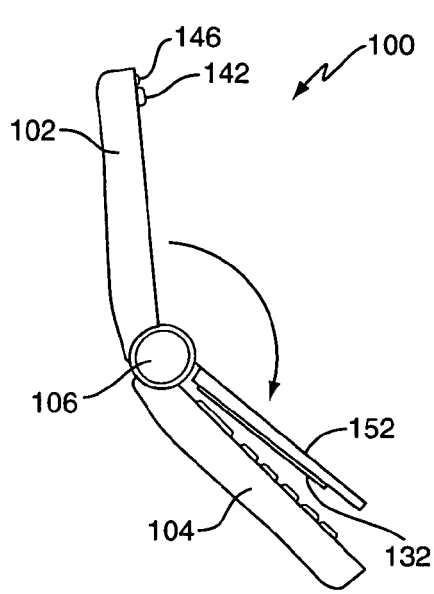
Figure 9D:
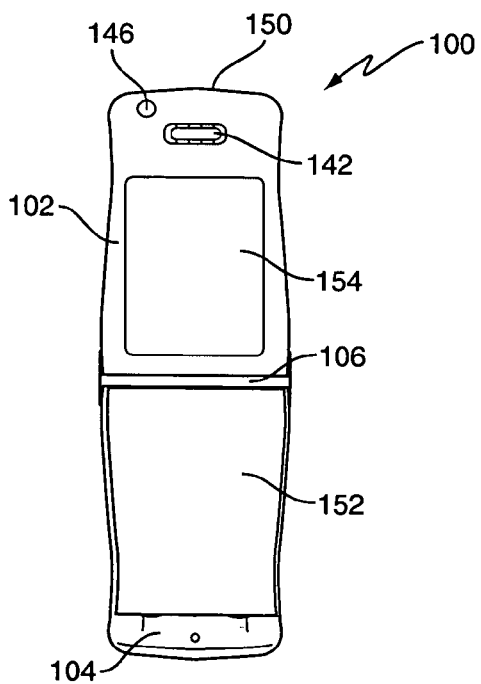
Figure 10A:
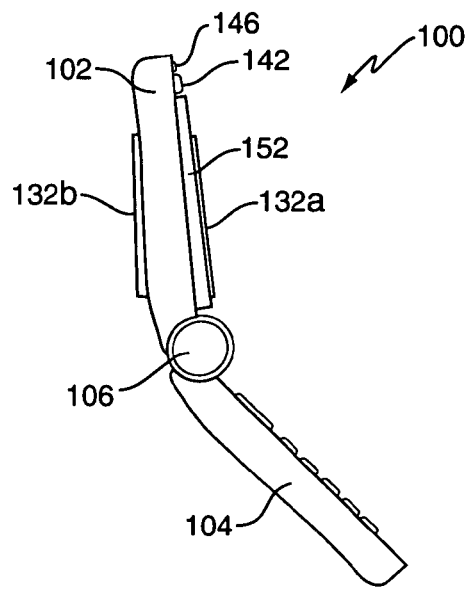
FIGS. 10A-10D illustrate another exemplary flip-type mobile station with a pivot member according to the present invention.
Figure 10B:
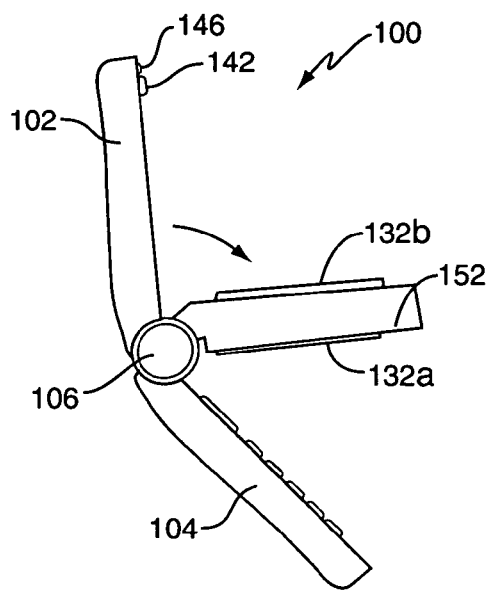
Figure 10C:
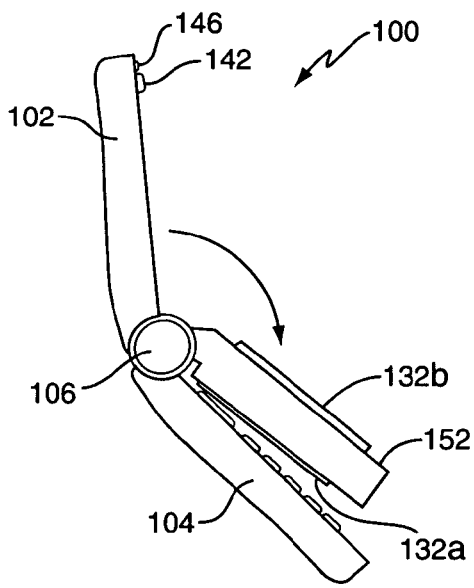
Figure 10D:
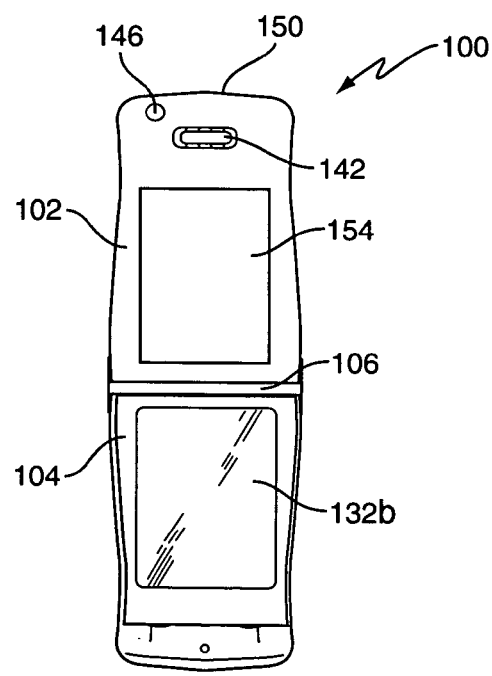

As shown in FIG. 9C-9D, rotating pivot member 152 to the second use position positions the display 132 proximate the base member 104. As a result, the user cannot view the display when pivot member 152 is positioned in the second use position. To address this, mobile station 100 may include a primary display 132a located on one side of pivot member 152, and a secondary display 132b located on the opposite side of pivot member 152, as shown in FIGS. 10A-10D. In general, primary display 132a provides the user with information when the flip-type mobile station 100 is open, while secondary display 132b generally provides the user with display information when the flip-type mobile station 100 is closed. However, primary and secondary displays 132a, 132b may also be used to provide information to the user based on the position of the pivot member 152. For example, when pivot member 152 is positioned in the first use position, shown in FIG. 10A, primary display 132a generally provides information to the user. However, when pivot member 152 is positioned in the second use position, shown in FIGS. 10C and 10D, primary display 132a is positioned adjacent the keypad, while secondary display 132b faces the user and generally provides display information to the user. It will be appreciated by those skilled in the art that rotating pivot member 152 to the second use position leaves an opening 154 in flip member 102, as shown in FIG. 10D. This opening 154 may or may not be present in the other pivot member and/or slide member embodiments described above.

While the above describes the invention in terms of a stick-type or flip-type mobile station 100, the present invention is not so limited. Indeed, any of the adjustment members of the present invention may be implemented on any type of mobile station 100. For example, the present invention may use a jack-knife or swivel-type mobile station 100, such as the one shown in FIGS. 11A and 11B. Swivel-type mobile station 100 comprises a swivel member 102, a base member 104, and a swivel coupler 107 that couples swivel member 102 to base member 104. The swivel-type mobile station 100 moves between the open and closed positions by spinning swivel member 102 about swivel coupler 107. As with the flip-type mobile station discussed above, the swivel-type mobile station 100 is in a use position whenever it is operating in a non-idle voice communication mode.

Figure 11A:
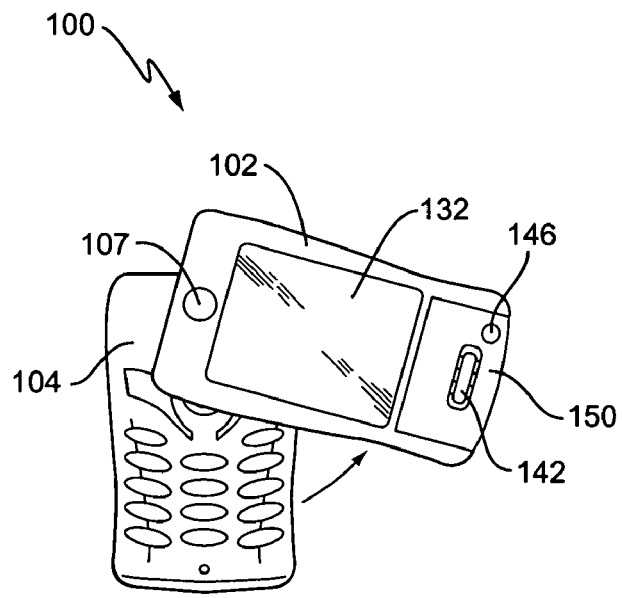
FIGS. 11A-11B illustrate an exemplary swivel-type mobile station with a slide member according to the present invention.
Figure 11B:
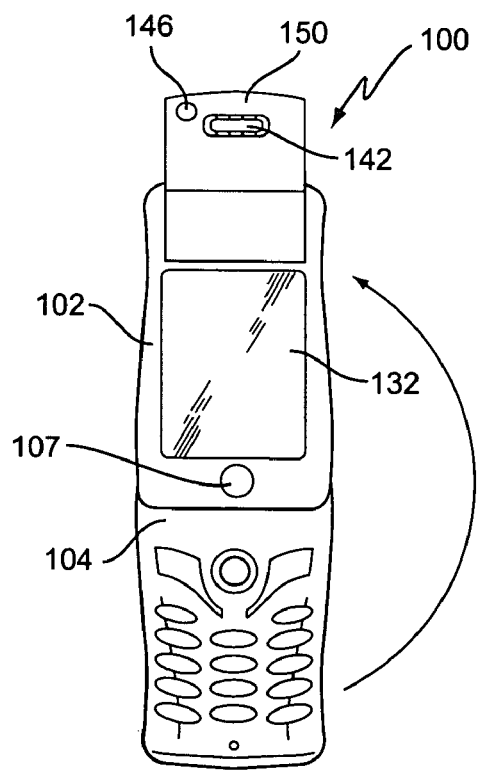

In the embodiment shown in FIGS. 11A and 11B, swivel type mobile station 100 uses a slide member 150, like the one shown in FIG. 4C, to increase the separation distance between audio signal output device 140 and the electronic circuits associated with mobile station 100. However, it will be appreciated by those skilled in the art that any of the slide members 150 and/or pivot members 152 described above may be used to increase the separation distance between the audio signal output device 140 and the electronic circuits of the swivel-type mobile station 100.

The above describes various embodiments of an adjustable member used to reduce EMI proximate an audio signal output device 140 by increasing the distance between the audio signal output device 140 and electronic circuits associated with the mobile station 100. Because moving one or more mobile station components may change the acoustics or other acoustic signal properties of the mobile station 100, and therefore the quality of the projected acoustic signal, the mobile station 100 of the present invention may also include audio processing circuitry to modify the audio signal applied to the audio signal output device 140 based on the position of the adjustable member. To that end, mobile station 100 may include a position detection circuit 126, as shown in FIG. 1, to detect the position of the adjustable member. Mobile station 100 may use any position detection means known in the art. For example, moving the adjustable member from the first use position to the second use position, or vice versa, may actuate an electrical or mechanical switch. Further, a user may independently activate a switch after moving the adjustment member to improve the acoustics of the audio output.

Alternatively, position detection circuit 126 may comprise a magnetic field dependent position sensor, such as a Hall effect sensor. A Hall effect sensor generates an output position signal in response to the detected changes in a magnetic field, as is well understood in the art. When the adjustable member includes an iron element having a magnetic field and when the Hall effect sensor is appropriately positioned proximate the magnetic iron element, the Hall effect sensor detects movement of the adjustable member by detecting changes in the magnetic field of the iron element. In the embodiments where the adjustable member moves speaker 142, using iron to construct at least a portion of the speaker coil provides a magnetic iron element. In these embodiments, the Hall effect sensor may monitor the position of the adjustable member by monitoring the magnetic field associated with the speaker coil.

In any event, position detection circuit 126 provides the position signal to audio processor 120 based on the detected position of the adjustable member. Audio processor 120 then modifies the audio signal applied to the audio signal output device 140 based on the position signal provided by the audio processor 120. For example, based on the detected position of the adjustable member, a frequency controller 122 may modify the electrical level of a specific frequency of the audio signal applied to the audio signal output device 140. Similarly, an equalizer 124 may modify the equalization settings of the audio signal applied to the audio signal output device 140 based on the detected position of the adjustable member.

The above describes an adjustment member that may be used to increase a separation distance between an audio signal output device 140 and electronic circuits associated with a mobile station 100 to reduce EMI proximate the audio signal output device 140. Preliminary tests of a mobile station 100 that uses the above-described adjustment member has shown >3 dB reductions in EMI. Further, EMI reductions have been observed when the separation distance has been increased by one inch or more.

While the above describes explicit first and second use positions, those skilled in the art will appreciate that moving the adjustable member may be a continuous operation and that moving the adjustable member to any position having a second separation distance greater than the first separation distance reduces the electro-magnetic interference. For example, slide member 150 need not be fully extended to be in a second use position. Similarly, pivot member 152 need not be fully rotated to be in a second use position. For example, the pivot member positions illustrated in FIGS. 8B, 9B, and 10B may also constitute second use positions. Further, it will be appreciated that the above-described adjustable members are not limited to the mobile stations used to illustrate the invention.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A mobile station comprising:
   an audio signal output device comprising a speaker configured to project acoustic signals based on an audio signal applied to the audio signal output device and an electro-magnetic audio output device configured to project electro-magnetic signals based on the audio signal applied to the audio signal output device;
   an electronic circuit generating electro-magnetic interference proximate said electro-magnetic audio output device; and
   an adjustable member selectively movable between a first use position for voice communications defining a first separation distance between the electro-magnetic audio output device and the electronic circuit, and a second use position for voice communications defining a second separation distance greater than the first separation distance to reduce electro-magnetic interference proximate the electro-magnetic audio output device caused by the electronic circuit.

2. The mobile station of claim 1 further comprising:
   a position detection circuit to detect the use position of the adjustable member; and
   an audio processor for selectively controlling the audio signal applied to the audio signal output device based on the detected position of the adjustable member.

3. The mobile station of claim 2 wherein the position detection circuit comprises one of a magnetic field dependent position detection circuit, a mechanical position detection circuit, and an electrical contact position detection circuit.

4. The mobile station of claim 2 wherein the electronic circuit includes a primary display screen circuit and a secondary display screen circuit and wherein one of the primary and secondary display screen circuits is activated based on the detected position of the adjustable member.

5. The mobile station of claim 2 wherein the audio processor includes a frequency controller and wherein the frequency controller controls an electrical level of a frequency of the audio signal applied to the audio signal output device based on the detected position of the adjustable member.

6. The mobile station of claim 2 wherein the audio processor includes an equalizer and wherein the equalizer controls an equalization setting of the audio signal applied to the audio signal output device based on the detected position of the adjustable member.

7. The mobile station of claim 1 wherein the electro-magnetic audio output device comprises a T-coil.

8. The mobile station of claim 1 wherein the electronic circuit comprises a transceiver circuit.

9. The mobile station of claim 1 wherein the adjustable member is part of a flip-type cellular telephone, a stick-type cellular telephone, or a swivel-type cellular telephone.

10. A mobile station comprising:
an audio signal output device comprising a speaker configured to project acoustic signals based on an audio signal applied to the audio signal output device and an electro-magnetic audio output device configured to project electro-magnetic signals based on the audio signal applied to the audio signal output device;
a transceiver circuit; and
an adjustable member selectively movable between a first use position for voice communications defining a first separation distance between the electro-magnetic audio device and the transceiver circuit, and a second use position for voice communications defining a second separation distance greater than the first separation distance to reduce electro-magnetic interference proximate the electro-magnetic audio output device caused by the transceiver circuit.

11. The mobile station of claim 10 further comprising:
a position detection circuit to detect the use position of the adjustable member; and
an audio processor for selectively controlling the audio signal applied to the audio signal output device based on the detected position of the adjustable member.

12. The mobile station of claim 11 wherein the position detection circuit comprises one of a magnetic field dependent position detection circuit, a mechanical position detection circuit, and an electrical contact position detection circuit.

13. The mobile station of claim 11 wherein the audio processor includes a frequency controller and wherein the frequency controller controls an electrical level of a frequency of the audio signal applied to the audio signal output device based on the detected position of the adjustable member.

14. The mobile station of claim 11 wherein the audio processor includes an equalizer and wherein the equalizer controls an equalization setting of the audio signal applied to the audio signal output device based on the detected position of the adjustable member.

15. The mobile station of claim 10 wherein the electro-magnetic audio output device comprises a T-coil.

16. The mobile station of claim 10 wherein the adjustable member is part of a flip-type cellular telephone, a stick-type cellular telephone, or a swivel-type cellular telephone.

17. A mobile station comprising:
an audio signal output device comprising a speaker configured to project acoustic signals based on an audio signal applied to the audio signal output device and an electro-magnetic audio output device configured to project electro-magnetic signals based on the audio signal applied to the audio signal output device;
an electronic circuit generating electro-magnetic interference proximate said electro-magnetic audio output device;
an adjustable member including the audio signal output device and selectively movable between a first use position for voice communications defining a first separation distance between the electro-magnetic audio output device and the electronic circuit, and a second use position for voice communications defining a second separation distance greater than the first separation distance to reduce electro-magnetic interference proximate the electro-magnetic audio output device caused by the electronic circuit;
a position detection circuit to detect the use position of the adjustable member; and
an audio processor to selectively control the audio signal applied to the audio signal output device based on the detected position of the adjustable member.

18. The mobile station of claim 17 wherein the position detection circuit comprises one of a magnetic field dependent position detection circuit, a mechanical position detection circuit, and an electrical contact position detection circuit.

19. The mobile station of claim 17 wherein the electronic circuit includes a primary display screen circuit and a secondary display screen circuit and wherein ne of the primary and secondary display screen circuits is activated based on the detected position of the adjustable member.

20. The mobile station of claim 17 wherein the audio processor includes a frequency controller and wherein the frequency controller controls an electrical level of a frequency of the audio signal applied to the audio signal output device based on the detected position of the adjustable member.

21. The mobile station of claim 17 wherein the audio processor includes an equalizer and wherein the equalizer controls an equalization setting of the audio signal applied to the audio signal output device based on the detected position of the adjustable member.

22. The mobile station of claim 17 wherein the electro-magnetic audio output device comprises a T-coil.

23. The mobile station of claim 17 wherein the electronic circuit comprises a transceiver circuit.

24. The mobile station of claim 17 wherein the adjustable member is part of a flip-type cellular telephone, a stick-type cellular telephone, or a swivel-type cellular telephone.

* * * * *